W. I. WOLVERTON.
ANIMAL TRAP.
APPLICATION FILED MAR. 17, 1908.
902,790.
Patented Nov. 3, 1908.
3 SHEETS—SHEET 1.
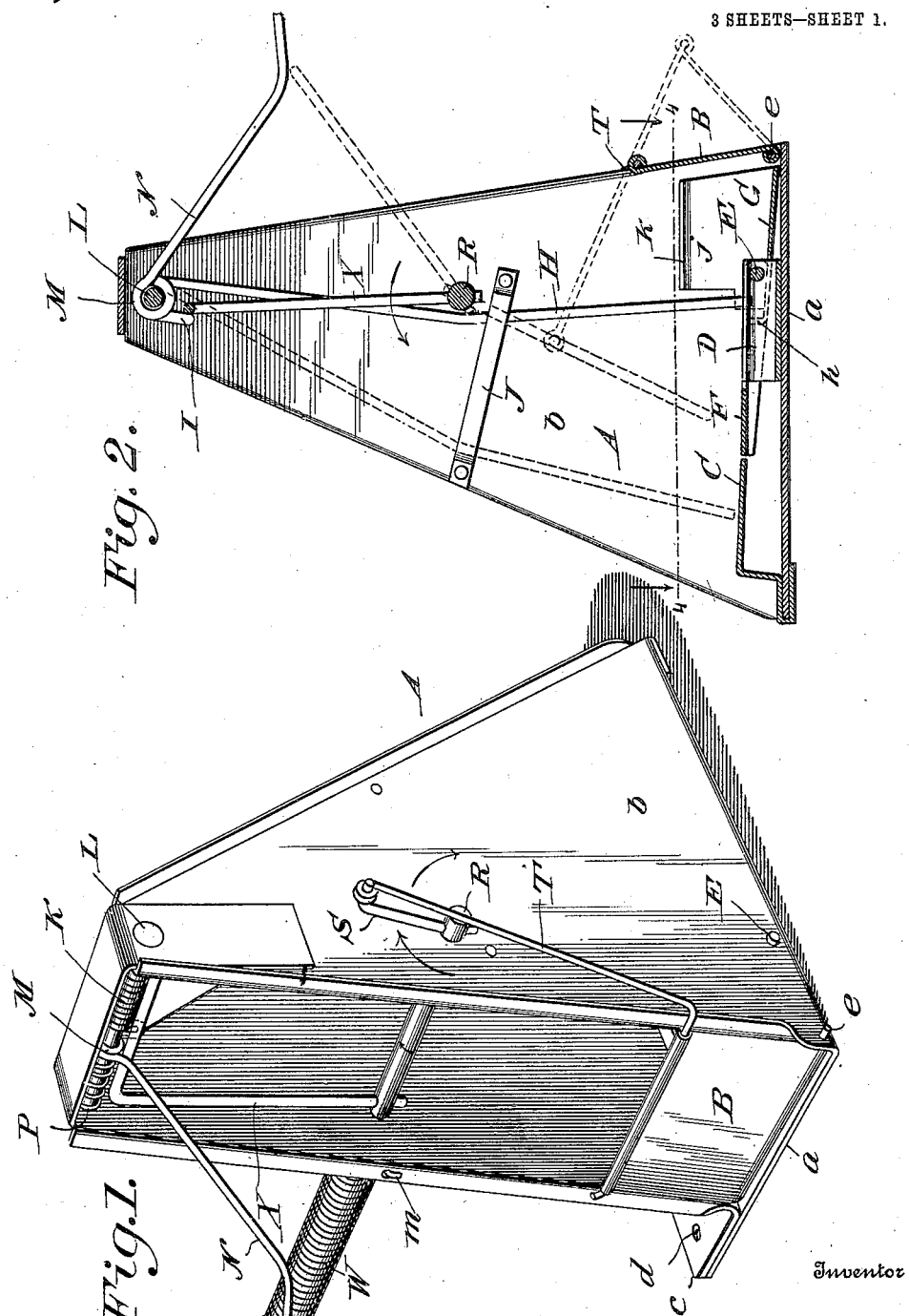

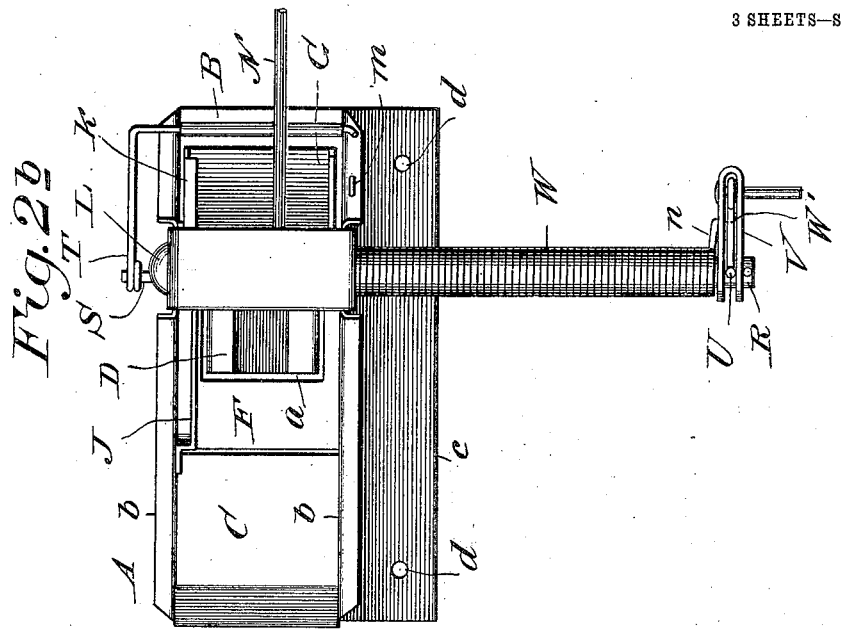
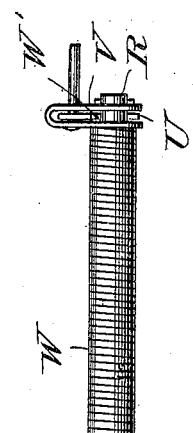
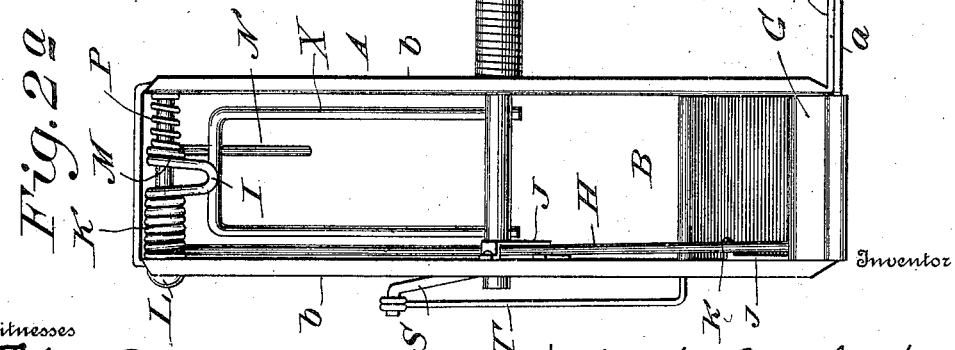

W. I. WOLVERTON.
ANIMAL TRAP.
APPLICATION FILED MAR. 17, 1908.
902,790.
Patented Nov. 3, 1908.
3 SHEETS—SHEET 3.
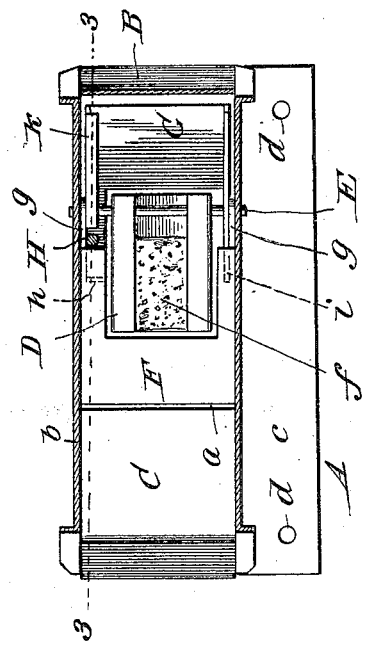
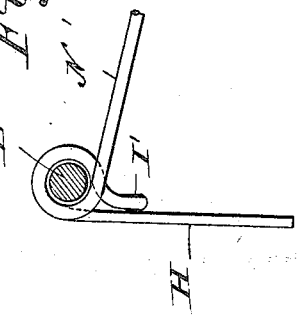
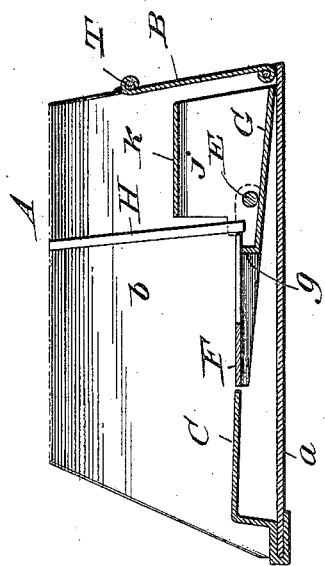
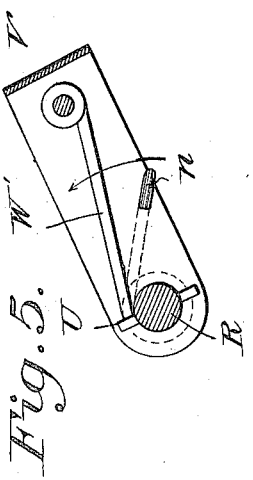
Witnesses
Phil E. Barnes
R. C. Braddock
Inventor
Washington I. Wolverton,
By William W. Deane
his Attorney
THE NORRIS PETERS CO., WASHINGTON, D. C.

UNITED STATES PATENT OFFICE.

WASHINGTON I. WOLVERTON, OF HOLTON, KANSAS.

ANIMAL-TRAP.

No. 902,790.　　　　　Specification of Letters Patent.　　　　Patented Nov. 3, 1908.

Application filed March 17, 1908.　Serial No. 421,691.

*To all whom it may concern:*

Be it known that I, WASHINGTON I. WOLVERTON, citizen of the United States, residing at Holton, in the county of Jackson and State of Kansas, have invented certain new and useful Improvements in Animal-Traps, of which the following is a specification.

My present invention relates to animal traps, particularly traps for destroying mice and rats; and it has for one of its objects to provide a trap calculated to kill an animal and throw the same clear of the trap, this being materially advantageous inasmuch as the odor of the animal does not remain in or on the trap where it would be likely to prompt other animals to keep away from the trap.

Another object of the invention is the provision of a trap adapted to operate in the manner stated and also adapted to set itself, whereby it is designed to kill and eject a number of animals in succession.

Other objects and advantageous features of the invention will be fully understood from the following description and claims when the same are read in connection with the drawings, accompanying and forming part of this specification, in which:

Figure 1 is a perspective view of the trap constituting the best practical embodiment of my invention of which I am cognizant. Fig. 2 is a vertical, central section of the trap. Fig. 2ª is a front elevation of the machine. Fig. 2ᵇ is a plan view of the same. Fig. 3 is a detail vertical section taken in the plane indicated by the line 3—3 of Fig. 4. Fig. 4 is a horizontal section taken in the plane indicated by the line 4—4 of Fig. 2, looking downward. Fig. 5 is an enlarged detail section illustrating the spring-winding crank of the trap and its appurtenances. Fig. 6 is an enlarged detail section illustrative of a modified construction hereinafter fully referred to.

Referring by letter to the said drawings and more particularly to Figs. 1 to 5 thereof: A is the main frame of my novel trap, which like all of the other elements of the trap is preferably, though not necessarily, made of metal. The said main frame comprises a bottom wall $a$ and connected side walls $b$, and in the preferred embodiment of the invention it is provided with a base flange $c$ designed to be screwed by a screw $d$, Fig. 1, or a plurality of screws to an apartment floor or other suitable support.

B is a gate hinged, as indicated by $e$, at the back end of the frame A and having for its office to prevent animals entering the frame through said end, and C is a platform arranged in the lower portion of the frame adjacent to the front end thereof and designed to assure an animal occupying such a position when the trap is sprung that the animal will receive the full force of the blow from the striker hereinafter described.

D is a bait-holder arranged on the bottom wall $a$ of frame A and having by preference a bottom wall, side walls and flanges extending inward from the upper edges of the latter. The said holder is adapted to receive a large piece of cheese or other bait, indicated by $f$ in Fig. 4, and is securely fastened in the frame A through the medium of a transverse pin E.

F is a trigger-plate, and G, a plate for enabling the trigger-plate to better engage and hold the arm H of the catch I, presently described. The plate F straddles the bait holder D and is provided with rearwardly extending side portions $g$, Fig. 4, which are pivoted on the transverse pin E, while the plate G is also pivoted on the pin E and has forwardly and upwardly extending portions $h$ and $i$ disposed under the plate F, Figs. 2 to 4, and also has an upwardly extending side portion $j$ which terminates in an inwardly extending flange $k$ designed to limit the rearward movement of the arm H in the manner which will be more fully set forth hereinafter.

The arm H of the catch I is guided in its movements by a strap J connected to one side wall of the frame A, and the said arm and catch are connected through a plurality of coils K which loosely surround a transverse rod or pin L extending between the side walls of the said frame. The catch I is provided at its opposite side, with reference to the coils K, with a coil M, and this latter merges into a rearwardly-extending brake arm N, clearly shown in Figs. 1 and 2.

P is an expansible coiled spring which surrounds the pin L and is interposed between the frame A and the brake arm N. The said spring P is compressed when put in position, and hence it tends to expand and by so doing press the coils K against the opposite side wall of frame A and prevents too free movement of the catch I, the brake arm N and the depending arm H.

R is a transverse shaft journaled in the side walls of the frame A. One end portion of the said shaft extends a slight distance outward beyond one side wall of the frame and is provided with a crank arm S to which is pivotally connected a link T which, in turn, is pivotally connected to the upper end of the gate B, whereby it will be manifest that when the shaft R is rotated in the direction indicated by arrow in Fig. 1, the gate B will be opened to the full extent—i.e., until it rests in a horizontal position and then will be closed or returned to the normal position illustrated. The other end portion of the shaft R extends a considerable distance outward beyond the other side wall of the frame A, Fig. 1, and is provided near its extremity with radially disposed studs U, Fig. 5. These studs U are straddled by a crank V loosely mounted on the shaft R, and to the said crank is pivoted a gravitating pawl $W^1$ arranged to engage the studs one after the other in the manner shown in Fig. 5.

Surrounding the rod R and interposed between the crank V and the adjacent side wall of the frame A is a coiled spring W which is connected at m to the frame A and at n to the crank V.

X is the striker of the trap. The said striker is fixed to and movable with the shaft R, and in the present and preferred embodiment of my invention is bail-shaped, with its side arms arranged adjacent to the inner sides of the side walls of the frame A.

It will be gathered from the forgoing that when the striker X bears against the catch I, as shown in Figs. 1 and 2, and the crank V is turned in the direction indicated by arrow in Figs. 1 and 5 about the shaft R, the spring W will be put under tension and will be held against casual expansion by the engagement of the pawl $W^1$ with one or the other of the studs U on shaft R. It will also be understood that when the striker X is released from the catch I in the manner to be hereinafter described in detail, the spring W will rapidly and forcibly rotate the shaft R and the striker X in the direction indicated by arrows in Figs. 1 and 2, with the result that the striker in sweeping above the platform C will kill the animal thereon and throw such animal out of the trap and a considerable distance away from the same. In this connection it will be remembered that on movement of the shaft R and striker X in the direction indicated by arrows, the gate B will be fully opened so as not to interfere with the ejection of the animal and will then be closed so as to prevent another animal from trying to enter the trap at the back end thereof.

The catch I is enabled to hold the striker X against movement under the action of the spring W by reason of the arm H of the catch being normally held against forward movement by the plate F. It will be noticed, however, that when the trigger-plate F is depressed by an animal moving toward the bait f, the arm H is released and rendered free to move forward, and consequently the striker X is enabled to press the catch I out of its way and sweep rapidly and forcibly over the platform C and the plates F and G and back to its position in rear of the catch I. Incidental to the last portion of the described movement of the striker X, the said striker engages the brake arm N with the result that movement of the striker is retarded and the arm N is raised to move the arm H backward. On said movement of the arm H it will strike against and be stopped by the flange k of the plate G and consequently the forward portion of the plate G will be raised and will throw the plate F upward and enable the latter to securely engage the arm H and hold the same against casual forward movement. It will be observed that in this way after the trap operates to kill and eject a mouse or other animal, the trap will automatically set itself and be in readiness to kill and eject the next animal that enters the front end of the trap, and so on. At this point I desire it understood that the front plate F is free to move independently of the rear plate G, this being advantageous inasmuch as when the arm H strikes the flange k of plate G, the force of the impulse the plate F receives from the plate G raises the plate F in time to enable it to prevent a casual or accidental movement of the arm H.

As will be readily noticed by reference to Fig. 4, the bait f is held in the lower portion of my novel trap in such manner that there is no liability of the bait being displaced by the movements of the striker X necessary to kill and eject the animals that enter the trap.

It will be obvious from the foregoing that the spring W may be wound up or put under tension each night or at other times in the discretion of the party having control of the trap.

When deemed desirable for any reason, a catch $I^1$, on arm $H^1$ and a brake arm $N^1$ arranged as shown in Fig. 6, relative to the pin L may be used in lieu of the corresponding elements I, H and N of Figs. 1 and 2 without involving departure from the spirit of my invention.

In addition to the practical advantages hereinbefore ascribed to my novel trap, it will be noted that the trap is simple and inexpensive in construction, and is well adapted to withstand the rough usage to which animal traps are ordinarily subjected; also, that the trap may be made of various sizes according to the sizes of the animals that are to be killed.

As before stated, the construction herein illustrated and described constitutes the best practical embodiment of my invention of which I am aware, but it is obvious that in the future practice of the invention such changes in the form, construction and relative arrangement of parts may be made as fairly fall within the scope of my invention as defined in the claims appended.

Having described my invention what I claim and desire to secure by Letters-Patent, is:

1. In an animal trap, the combination of a frame, a spring-impelled striker, movable means for normally holding the striker against movement, movable means normally engaging the first mentioned means, for effecting the release of the striker from said first mentioned means, and means movable by the striker, for braking or retarding the completion of the movement of the striker and for reëstablishing engagement between the first named means and the second named means.

2. In an animal trap, the combination of a frame, a spring-impelled striker, movable means for normally holding the striker against movement, a trigger for normally preventing movement of said means, and means movable by the striker, for braking or retarding the completion of the movement of the striker and for reëstablishing engagement between the first named means and the trigger.

3. In an animal trap, the combination of a frame, a spring-impelled striker, a movable catch for normally holding the striker against movement, movable means for effecting the release of the striker from the catch, and means movable by the striker, for braking or retarding the completion of the movement of the striker and for reëstablishing engagement between the catch and the first named means.

4. In an animal trap, the combination of a frame, a spring-impelled striker, a movable catch for normally holding the striker against movement, a trigger for effecting the release of the striker from the catch, and means movable by the striker, for braking or retarding the completion of the movement of the striker and for reëstablishing engagement between the catch and the trigger.

5. In an animal trap, the combination of a frame, a rotary, spring-impelled striker, a swinging catch for normally holding the striker against movement, movable means for effecting the release of the striker from the catch, and an arm connected and movable with the catch and movable by the striker, for braking or retarding the completion of the movement of the striker and for reëstablishing engagement between the catch and the said means.

6. In an animal trap, the combination of a frame, a rotary, spring-impelled striker, a swinging catch for normally holding the striker against movement, movable means for effecting the release of the striker from the catch, an arm connected and movable with the catch and normally engaged by the said means, and a second arm connected and movable with the catch and movable by the striker, for braking or retarding the completion of the movement of the striker and for reëstablishing engagement between the first named arm and the said means.

7. In an animal trap, the combination of a frame, a rotary, spring-impelled striker, a swinging catch for normally holding the striker against movement, an arm connected and movable with the catch, a swinging trigger-plate normally engaging said arm, and a second arm connected and movable with the catch and movable by the striker, for braking or retarding the completion of the movement of the striker and for moving the first named arm into engagement with the trigger-plate.

8. In an animal trap, the combination of a frame, a rotary, spring-impelled striker, a swinging catch for normally holding the striker against movement, an arm connected and movable with the catch, a swinging trigger-plate normally engaging said arm, a second swinging plate movable by the arm, for moving the trigger-plate and assuring engagement of the same with the arm, and a second arm connected and movable with the catch and movable by the striker, for braking or retarding the completion of the movement of the striker and for moving the first named arm into engagement with the trigger-plate.

9. In an animal trap, the combination of a frame having an entrance and an exit, a spring-impelled striker for killing an animal and throwing it through said exit, means for normally holding the striker against movement, movable means for effecting the release of the striker from the first named means, a shaft journaled in the frame and connected and movable with the striker and having a crank arm, a swinging gate for normally closing the exit of the frame, and a connection intermediate said crank arm and the gate for opening and closing the latter incidental to an operation of the striker.

10. In an animal trap, the combination of a frame, a shaft journaled in the frame, a striker fixed to and rotatable with the shaft, means for normally holding the striker against movement, movable means for effecting the release of the striker from the first named means, a spring coiled about the shaft and having one end connected with the frame, means connected with the spring and movable about the shaft to put the spring under tension, and means on the shaft for preventing retrograde movement of the means movable about the shaft.

11. In an animal trap, the combination of a frame, a shaft journaled in the frame, a striker fixed to and rotatable with the shaft, means for normally holding the striker against movement, movable means for effecting the release of the striker from the first named means, a spring coiled about the shaft and having one end connected with the frame, a crank loosely mounted on and movable about the shaft and connected with the opposite end of the spring, and a stop on the shaft for preventing retrograde movement of said crank.

12. In an animal trap, the combination of a frame, a rotary spring-impelled striker, a swinging catch for normally holding the striker against movement, an arm connected and movable with the catch, a swinging trigger-plate normally engaging said arm, a second swinging plate movable by the arm, for moving the trigger-plate and assuring engagement of the same with the arm, a second arm connected and movable with the catch and movable by the striker, for braking or retarding the completion of the movement of the striker and for moving the first named arm into engagement with the trigger-plate, and a bait holder located in the frame and between the two plates.

13. In an animal trap, the combination of a frame, a rotary spring-impelled striker, a swinging catch for normally holding the striker against movement, an arm connected and movable with the catch, a swinging trigger-plate normally engaging said arm, a second swinging plate movable by the arm, for moving the trigger-plate and assuring engagement of the same with the arm, a second arm connected and movable with the catch and movable by the striker, for braking or retarding the completion of the movement of the striker and for moving the first named arm into engagement with the trigger-plate, a bait-holder located in the frame and between the two plates, and a transverse pin connecting the plates and the bait holder with the frame.

14. In an animal trap, the combination of a frame, a spring-impelled striker, movable means for normally holding the striker against movement, a swinging trigger-plate normally engaging said means, for effecting the release of the striker therefrom, means movable by the striker, for braking or retarding the completion of the movement of the striker and for reëstablishing engagement between the first named means and the trigger-plate, a second swinging plate movable by the first named means, for moving the trigger-plate and assuring engagement of the same with said means, and a bait holder secured between the two plates.

15. In an animal trap, the combination of a frame, a spring-impelled striker, movable means for normally holding the striker against movement, a swinging trigger-plate normally engaging said means, for effecting the release of the striker therefrom, means movable by the striker, for braking or retarding the completion of the movement of the striker and for reëstablishing engagement between the first named means and the trigger-plate, a second swinging plate movable by the first named means, for moving the trigger-plate and assuring engagement of the same with said means, a bait holder disposed between the two plates, and a transverse pin connecting the frame with the two plates and the bait-holder.

16. In an animal trap, the combination of a frame having an entrance and an exit, a spring-impelled striker for killing an animal and throwing it through said exit, means for normally holding the striker against movement, movable means for effecting the release of the striker from the first named means, a gate for normally closing the exit of the frame, and a connection intermediate the striker and the gate for opening and closing the latter incidental to an operation of the former.

17. In an animal trap, the combination of a frame having an entrance and an exit, a spring-impelled striker for killing an animal and throwing it through said exit, means for normally holding the striker against movement, movable means for effecting the release of the striker from the first named means, a gate for normally closing the exit of the frame, hinged to said frame, a crank connected and movable with the striker, and a link connecting the crank and the gate.

In testimony whereof I affix my signature in presence of two witnesses.

WASHINGTON I. WOLVERTON.

Witnesses:
FRANK MAUCK,
E. H. SMITH.